United States Patent
Brueckner et al.

(10) Patent No.: US 10,295,343 B2
(45) Date of Patent: May 21, 2019

(54) METHOD AND SYSTEM FOR DETECTING A RELATIVE POSITION OF A MOBILE TERMINAL DEVICE WITH RESPECT TO A VEHICLE

(71) Applicant: Volkswagen Aktiengesellschaft, Wolfsburg (DE)

(72) Inventors: Claus-Peter Brueckner, Braunschweig (DE); Bastian Bartels, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 79 days.

(21) Appl. No.: 15/633,797

(22) Filed: Jun. 27, 2017

(65) Prior Publication Data
US 2017/0370712 A1    Dec. 28, 2017

(30) Foreign Application Priority Data
Jun. 27, 2016   (DE) .................. 10 2016 111 707

(51) Int. Cl.
  *G01B 21/16*  (2006.01)
  *G01S 5/02*  (2010.01)
  *B60R 25/24*  (2013.01)

(52) U.S. Cl.
  CPC ............ *G01B 21/16* (2013.01); *G01S 5/0205* (2013.01); *B60R 25/24* (2013.01)

(58) Field of Classification Search
  CPC ........ G01B 21/16; G01S 5/0205; B60R 25/24
  See application file for complete search history.

(56) References Cited

U.S. PATENT DOCUMENTS 8,643,545 B2 * 2/2014 Strutt .................... G01S 5/0289
                                                    342/451
9,467,817 B1 * 10/2016 Van Wiemeersch ........................
                                                    H04W 4/046
(Continued)

FOREIGN PATENT DOCUMENTS

DE    102012204673    9/2012
WO    2005088561      9/2005

OTHER PUBLICATIONS

William Strunk Jr. and E.B. White, The Elements of Style, 3rd Edition, all pages. (Year: 1979).*

*Primary Examiner* — Calvin Cheung
(74) *Attorney, Agent, or Firm* — 2SPL Patentanwälte PartG mbB; Mani Arabi

(57) ABSTRACT

The invention relates to a method of detecting a relative position of a mobile terminal device with respect to a vehicle.
It is provided for the method to include the following steps: generating reference measurement values relating to a predefined relative position of a calibration device with respect to a calibration vehicle, generating position measurement values which relate to the current relative position of the mobile terminal device with respect to the vehicle, evaluating the reference measurement values and the position measurement values for detecting the current relative position of the mobile terminal device with respect to the vehicle, and storing the generated reference measurement values in a database, wherein the database is a database outside the vehicle which the vehicle may access by means of a communication connection.
The invention is based on the object to provide a possibility to minimize deviations in the detection of the relative positions of different mobile terminal devices with respect to a vehicle.

13 Claims, 2 Drawing Sheets

(56) References Cited

U.S. PATENT DOCUMENTS

Figure 1:
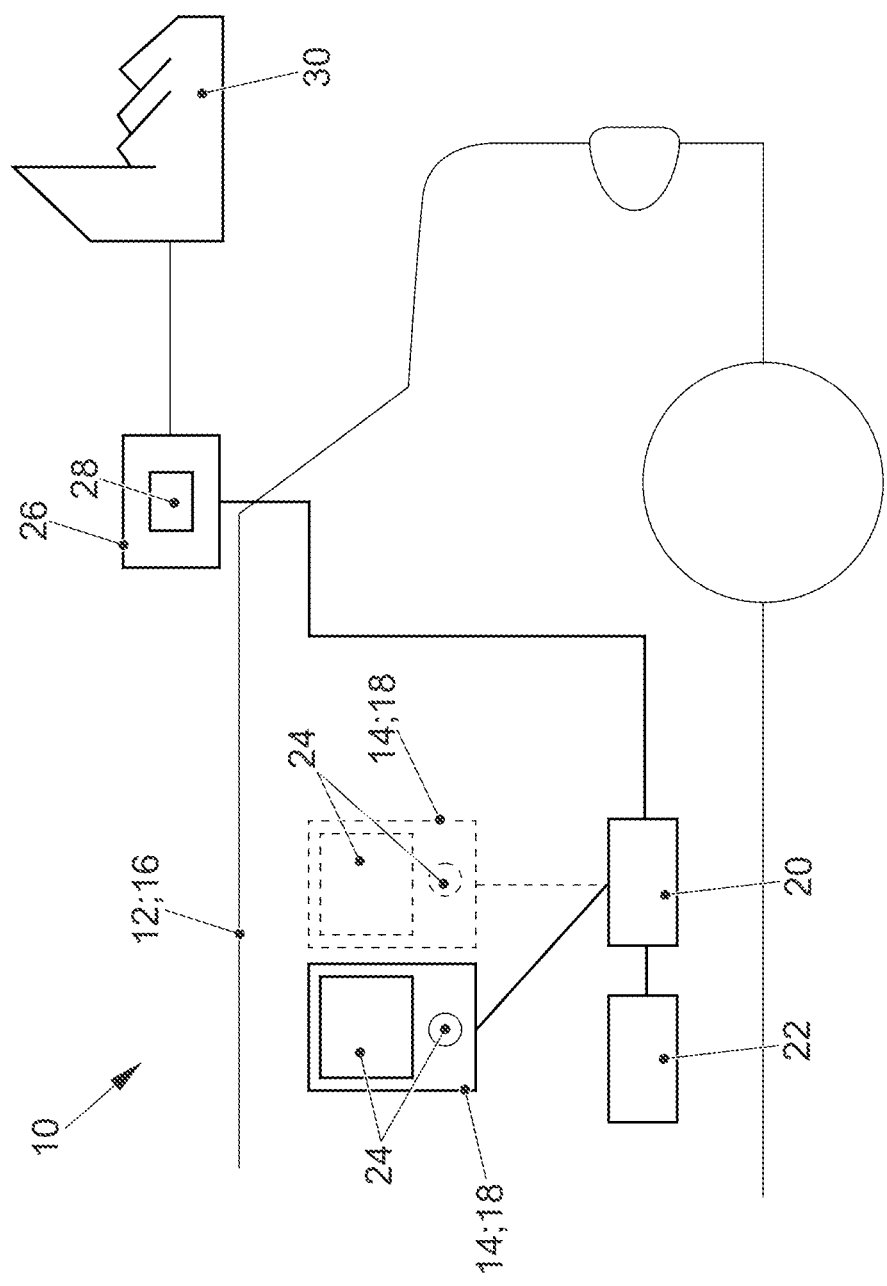

| | | | |
|---|---|---|---|
| 2008/0204281 A1* | 8/2008 | Sugiura | B60R 25/24 340/988 |
| 2009/0098907 A1* | 4/2009 | Huntzicker | G01C 21/12 455/556.1 |
| 2009/0309759 A1* | 12/2009 | Williams | G08G 1/14 340/932.2 |
| 2010/0171642 A1* | 7/2010 | Hassan | G01C 17/38 340/992 |
| 2015/0149042 A1* | 5/2015 | Cooper | B60R 16/037 701/48 |
| 2015/0177003 A1* | 6/2015 | Ho | H04W 4/02 701/408 |
| 2015/0193949 A1* | 7/2015 | Katz | G02B 27/017 345/8 |
| 2016/0248904 A1* | 8/2016 | Duvaut | H04M 1/72577 |
| 2016/0377736 A1* | 12/2016 | Zeitzew | G01S 19/51 342/357.34 |
| 2017/0048680 A1* | 2/2017 | Chuang | H04W 76/10 |
| 2017/0136992 A1* | 5/2017 | Hamada | B60R 25/24 |
| 2018/0187473 A1* | 7/2018 | Norichika | B60R 25/31 |
| 2018/0212794 A1* | 7/2018 | Setomoto | H04L 12/2809 |

\* cited by examiner

METHOD AND SYSTEM FOR DETECTING A RELATIVE POSITION OF A MOBILE TERMINAL DEVICE WITH RESPECT TO A VEHICLE

The invention relates to a method for detecting a relative position of a mobile terminal device with respect to a vehicle and a system for detecting a relative position of a mobile terminal device with respect to a vehicle.

With modern vehicles, mobile terminal devices, like e.g. smartphones, may already be used to lock or unlock vehicle doors. Reference DE 197 12 911 A1 discloses a keyless access system of a vehicle which is based on sensor data of a magnetic field sensor of the vehicle. Apart from that, for example from US 2014/0266594 A1 a technology is known which allows to start a vehicle using a portable device.

For a reliable and safe implementation of the described functions it is necessary to detect the relative position of a mobile terminal device with respect to a vehicle.

Vehicle access systems using near-field communication technology are already part of the prior art. Reference DE 10 2013 221 335 A1 discloses an exterior door handle for a vehicle, the exterior door handle including a near-field communication means which is configured for a passive data transmission.

Reference DE 10 2013 015 478 A1 proposes a method of detecting whether a mobile communication device is within a radius to be defined around a reading device of a vehicle, wherein by means of a communication connection between the reading device and the communication device determined positions of the vehicle and the communication device are exchanged in order to determine whether the position of the vehicle and the position of the communication device are within the radius to be defined.

Prior solutions, however, do not consider the different physical characteristics of mobile terminal devices which result from the design and type of the used subsystems. The different physical characteristics of mobile terminal devices lead to different measurement values in the determination of the relative position of different mobile terminal devices with respect to a vehicle. Measures to compensate such deviations conditioned by the design are currently not known in the localization of mobile terminal devices.

A reliable determination regarding how the mobile terminal device is positioned with respect to the vehicle or its individual components may not be executed or not with the sufficient necessary precision due to the described variance of the measured values of different mobile terminal devices.

The invention is now based on the object to provide a possibility to minimize deviations in the detection of the relative positions of different mobile terminal devices with respect to a vehicle.

This object is solved by the method of claim 1 and/or the system of claim 13.

With the inventive system of detecting a relative position of a mobile terminal device with respect to a vehicle, reference measurement values are generated which relate to a predefined relative position of a calibration device with respect to a calibration vehicle. Apart from that, position measurement values are generated which relate to the current relative position of the mobile terminal device with respect to the vehicle. The reference measurement values and the position measurement values are then evaluated for detecting the current relative position of the mobile terminal device with respect to the vehicle. Generating the reference measurement values which relate to a predefined relative position of the calibration device with respect to the calibration vehicle is preferably done before the initial generation of position measurement values which relate to the current relative position of the mobile terminal device with respect to the vehicle. The method further includes storing the generated reference measurement values in a database, wherein the database is a database outside the vehicle which the vehicle may access by means of a communication connection. The database outside the vehicle may be stored on a central computer which the vehicle may, for example, access via a mobile online service. Preferably, also further users and/or vehicle manufacturers have access to the database on the central computer so that an exchange of reference measurement values among different users or the provision of reference measurement values by a vehicle manufacturer may be possible. Alternatively or additionally the database may also be stored on the mobile terminal device. This way, reference measurement values stored in the database may be used for detecting the relative position of the mobile terminal device with respect to different vehicles without a radio connection to a central computer being required. The central computer may be a backend of a vehicle manufacturer or a third party provider. By storing the generated reference measurement values in a database, the reference measurement values may be deposited for a repeated use.

The inventive method has the advantage that by considering exact reference measurement values in addition to the position measurement values measurement value variances which are due to the design of the components of the mobile terminal device may be compensated. By compensating the measurement value variances by means of the reference measurement values the precision of the determination of the relative position of the mobile terminal device with respect to the vehicle is increased.

The mobile terminal device may be used as a calibration device. If the mobile terminal device is used as a calibration device, the reference measurement values relate to a predefined relative position of the mobile terminal device with respect to the calibration vehicle. When using the mobile terminal device as a calibration device, no further reference device is necessary for executing the method and thus the method is simplified. Alternatively or additionally the vehicle may be used as a calibration vehicle. If the vehicle is used as a calibration vehicle, the reference measurement values relate to a predefined relative position of the calibration device and/or the mobile terminal device with respect to the vehicle. When using the vehicle as a calibration device, no further reference vehicle is necessary for executing the method and thus the method is simplified.

However, also a reference device structurally identical to the mobile terminal device may be used as a calibration device. The reference device here is preferably a device of the same type and/or the same model as the mobile terminal device. By using a reference device as a calibration device structurally identical to the mobile terminal device, generating the reference measurement values may be done without the mobile terminal device used later being required. Thus, a pre-configuration for a certain model and/or a certain type of a mobile terminal device may be executed. If the mobile terminal device is configured as a smartphone, another smartphone of the same model may be used as a reference device.

Alternatively or additionally a reference vehicle structurally identical to the vehicle may be used as a calibration vehicle. The reference vehicle here is preferably a vehicle of the same type and/or the same model as the vehicle in which the reference measurement values for detecting the relative position of a mobile terminal device with respect to the vehicle are evaluated later. By using a reference vehicle structurally identical to the vehicle as a calibration vehicle, generating the reference measurement values may be done without the vehicle used later being required. Thus, a pre-configuration for a certain model and/or a certain type of a vehicle may be executed.

The method may further include retrieving the generated reference measurement values from the database by the vehicle. Here, the stored reference measurement values may also be retrieved by different vehicles so that the same may be used when detecting the relative position of a mobile terminal device with respect to the respective vehicles. In particular, by storing the generated reference measurement values, also a database may be generated which includes reference measurement values of different calibration devices and/or calibration vehicles. For example, when detecting the relative position of a mobile terminal device with respect to a vehicle for the first time, a user may use reference measurement values from such a database.

Generating the reference measurement values and/or storing the reference measurement values may be done by the manufacturer of the vehicle and/or by a user of the vehicle. For example, the vehicle manufacturer updates the database by supplementing reference measurement values regarding mobile terminal devices which have been released for being used as vehicle keys. If the mobile terminal device is configured as a smartphone, updating the database may include storing reference measurement values regarding smartphone models which have been released by the manufacturer for being used as vehicle keys for his vehicles. Updates may, for example, take place in regular temporal intervals or irregularly.

Generating reference measurement values which relate to a predefined relative position of the calibration device with respect to the calibration vehicle may include positioning the calibration device in a predefined calibration position within the calibration vehicle. Preferably, the calibration vehicle includes a receptacle for the calibration device, so that an accidental erroneous positioning by a user may be prevented. Preferably, the receptacle is adapted to the model and/or type of the calibration device so that the receptacle determines the position and/or the orientation of the calibration device. The exact positioning and/or orientation of the calibration device is of special importance, as an erroneous positioning of the calibration device would lead to the generation of reference measurement values which are less suitable to compensate reference measurement variances of mobile terminal devices.

Generating reference measurement values which relate to a predefined relative position of the calibration device with respect to the calibration vehicle may include repeatedly detecting the predefined relative position of the calibration device with respect to the calibration vehicle and/or averaging the measurement values detected by repeatedly detecting the relative position of the calibration device with respect to the calibration vehicle. By repeatedly detecting the predefined relative position of the calibration device with respect to the calibration vehicle and averaging the measurement values detected by repeatedly detecting the relative position of the calibration device with respect to the calibration vehicle, measurement inaccuracies may be compensate d, so that the generated reference measurement values may be used for more precisely compensating measurement value variances which are due to design.

The method may further include generating reference measurement values relating to predefined relative positions of the calibration device with respect to the calibration vehicle. By considering several predefined relative positions when generating the reference measurement values, measurement value deviations of the calibration device depending on direction, distance and/or function may be determined and be considered when generating reference measurement values, so that the generated reference measurement values may be used for more precisely compensating measurement value variances which are due to design.

Generating reference measurement values which relate to a predefined relative position of the calibration device with respect to the calibration vehicle may include operating a man-machine interface of the calibration device and/or operating a man-machine interface of the calibration vehicle. The man-machine interface of the calibration device and/or the man-machine interface of the calibration vehicle may include a display device and/or one or several operating elements. In particular, the calibration device and/or the calibration vehicle is configured to support a user in generating the reference measurement values, preferably by displaying information and/or recommended action by the display device of the respective man-machine-interface. The calibration device and/or the calibration vehicle may be configured to request a user to position the calibration device in a predefined calibration position within the calibration vehicle.

The method may further include generating reference measurement values relating to vehicle-specific parameters. Consequently, detecting the current relative position of the mobile terminal device with respect to the vehicle not only takes place considering reference measurement values relating to a predefined relative position of a calibration device with respect to a calibration vehicle, but also considering reference measurement values relating to vehicle-specific parameters. The vehicle model and/or the vehicle type and/or its equipment may be further reasons for a measurement value variance. Balancing these vehicle parameter related measurement value variances may be done by using reference measurement values which consider vehicle specific parameters when evaluating the reference measurement values and the position measurement values for detecting the current relative position of the mobile terminal device with respect to the vehicle.

The vehicle-specific parameters may relate to the arrangement and/or implementation of one or several antennas, the chassis shape and/or the chassis materials of the vehicle. The arrangement and implementation of one or several antennas, the chassis shape and the chassis materials of the vehicle influence the radio signals transmitted and/or received within the vehicle and in its periphery. To be able to accordingly balance position measurement values relating to the current relative position of the mobile terminal device with respect to the vehicle by means of reference measurement values, these vehicle-specific parameters are to be considered when generating the reference measurement values. Apart from that, additionally digital high-frequency (HF) models of vehicles and/or mobile terminal devices may be considered to generate the reference measurement values by means of high-frequency simulation, for example.

The method may include validating the generated reference measurement values by the generated position measurement values. Due to the plurality of position measurement values recorded during the operation of the vehicle and the mobile terminal device, these values are especially suitable for validating the previously generated reference measurement values. The method may include adjusting the generated reference measurement values by the generated position measurement values. This may take place, for example, when validating the reference measurement values by the generated position measurement values was not successful due to value deviations. A failed validation implies erroneous reference measurement values so that an adjustment of the reference measurement values by the generated position measurement values leads to the fact that the relative position of the mobile terminal device with respect to the vehicle may be determined more precisely. The method may further include replacing the generated reference measurement values by the generated position measurement values. By this, when initially detecting the relative position of the mobile terminal device with respect to the vehicle, for one time generally predefined reference measurement values may be used, wherein the same are replaced by values, before the second detection of the relative position of the mobile terminal device with respect to the vehicle, which have been generated during the first detection of the relative position of the mobile terminal device with respect to the vehicle.

The inventive system for detecting a relative position of a mobile terminal device with respect to a vehicle includes a mobile terminal device and a vehicle. The vehicle includes an evaluation device. The system is configured to execute the method of detecting a relative position of a mobile terminal device with respect to a vehicle according to any of the above described embodiments. The same benefits and modifications as described above apply.

Further preferred configurations of the invention result from the remaining features stated in the sub-claims.

The various embodiments of the invention mentioned in this application may advantageously be combined with each other unless stated otherwise in the individual case.

Figure 2:
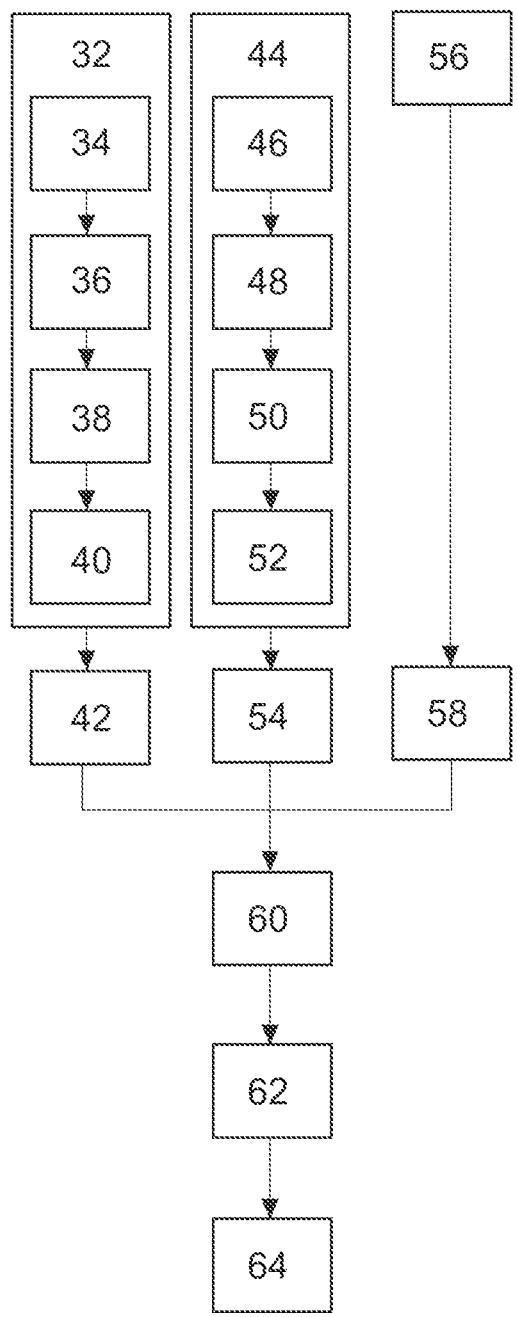

The invention is hereinafter explained in embodiments using the associated drawings, in which:

FIG. 1 shows a schematic illustration of an inventive system for detecting a relative position of a mobile terminal device with respect to a vehicle; and FIG. 2 shows a flow chart of an inventive method for detecting a relative position of a mobile terminal device with respect to a vehicle.

FIG. 1 shows a system 10 for detecting a relative position of a mobile terminal device 14 with respect to a vehicle 12. The vehicle 12 includes an evaluation device 20 configured to generate reference measurement values relating to a predefined relative position of a calibration device 18 with respect to a calibration vehicle 16, the mobile terminal device 14 being used as a calibration device 18 and the vehicle 12 being used as a calibration vehicle 16. The predefined relative position of the calibration device 18, i.e. here the mobile terminal device 14, with respect to the calibration vehicle 16, i.e. here the vehicle 12, is represented by a dashed illustration of the mobile terminal device 14, 18.

The calibration device 18 may also be configured as an independent reference device structurally identical to the mobile terminal device 14. It may be provided that the calibration device 18 may so to speak be used as a master device for different mobile terminal devices. Consequently, for example, groups of mobile terminal devices of one manufacturer or defined by one or several technical features, for example interfaces, antenna types or the like, may simultaneously be covered.

The mobile terminal device 14, 18 is implemented as a smartphone. The generated reference measurement values are stored by the evaluation device 20 of the vehicle 12, 16 in a database 28 on a central computer 26. The vehicle 12, 16 further includes a communication device by means of which the vehicle 12, 16 may set up a communication connection to the central computer 26. The communication connection between the vehicle 12, 16 and the central computer 26 is provided by a mobile online service.

The manufacturer 30 of the vehicle 12 further has a communication connection to the central computer 26 via which the same may update the database 28. For updating the database 28 of the central computer 26, the manufacturer 30 stores reference measurement values of mobile terminal devices which have been released for being used as vehicle keys in the database 28.

The evaluation device 20 of the vehicle 12, 16 is further configured to generate position measurement values relating to the current relative position of the mobile terminal device 14 with respect to the vehicle 12. The current relative position of the mobile terminal device 14 with respect to the vehicle 12 is represented by the illustration of the mobile terminal device 14 in solid lines.

The vehicle 12 and the mobile terminal device 14 each include a man-machine-interface 22, 24. The man-machine-interfaces 22, 24 each include a display device and several operating elements and are configured to support the user in generating the reference measurement values and in generating the position measurement values, i.e. by displaying information and recommended action.

Apart from that, the evaluation device 20 of the vehicle 12 is configured to retrieve reference measurement values from the database 28 of the central computer 26 to evaluate the reference measurement values and the position measurement values for detecting the current relative position of the mobile terminal device 14 with respect to the vehicle 12. The evaluation device 20 and the man-machine interface 22 may at least partially be integrated in computing units of the vehicle 12, like, e.g., one or several control devices for navigation or entertainment, for example.

FIG. 2 shows a method for detecting a relative position of a mobile terminal device 14 with respect to a vehicle 12, starting with the following step:

32) generating reference measurement values relating to a first predefined relative position of a calibration device 18 with respect to a calibration vehicle 16.

In this example, generating the reference measurement values is done by the manufacturer 30 of the vehicle 12, i.e. directly after the production of the vehicle 12 and before its delivery to the customer. The calibration device 18 used by the manufacturer 30 is a reference device structurally identical to the mobile terminal device 14. The vehicle 12 itself is used as a calibration vehicle 16. So that evaluable reference measurement values may be generated, the calibration device 18 configured as a smartphone has to be brought into the first predefined position, so that generating the reference measurement values relating to the first predefined relative position of the calibration device 18 with respect to the calibration vehicle 16 includes the following step:

34) positioning the calibration device 18 in a first predefined calibration position within the calibration vehicle 16.

The calibration vehicle 16, which is at the same time the vehicle 14 regarding which the relative position of the mobile terminal device 14 is to be detected, comprises a first receptacle for the calibration device 18. After the arrangement of the calibration device 18 in the first receptacle the calibration device is in the first predefined calibration position. To acknowledge that the calibration device is in the first calibration position, generating the reference measurement values relating to the first predefined relative position of the calibration device 18 with respect to the calibration vehicle 16 includes the following step:

36) operating a man-machine interface 22 of the calibration vehicle 16.

For increasing the quality and/or increasing the accuracy of the reference measurement values, generating the reference measurement values relating to the first predefined relative position of the calibration device 18 with respect to the calibration vehicle 16 includes the following steps:

38) repeatedly detecting the first predefined relative position of the calibration device 18 with respect to the calibration vehicle 16; and
40) averaging the measurement values detected by repeatedly detecting the relative position of the calibration device 18 with respect to the calibration vehicle 16.

To make the detected reference measurement values accessible for the vehicle user, the method further includes the following step:

42) storing the generated reference measurement values relating to the first predefined relative position of a calibration device 18 with respect to a calibration vehicle 16 in a database 28.

Storing the reference measurement values in the database 28 is done by the manufacturer 30 of the vehicle 12. The database 28 is a database 28 outside the vehicle which the vehicle 12 may access by means of a communication connection. Accessing the database is done by using a mobile online service.

To be able to detect the relative position of the mobile terminal device 14 with respect to the vehicle 12 with an even higher accuracy later on, the method further includes the following step:

44) generating reference measurement values relating to a second predefined relative position of the calibration device 18 with respect to the calibration vehicle 16.

Generating these reference measurement values is also done by the manufacturer 30 of the vehicle 12. Analogous to generating the reference measurement values relating to the first predefined relative position of the calibration device 18 with respect to the calibration vehicle 16, generating the reference measurement values relating to the second predefined relative position of the calibration device 18 with respect to the calibration device 16 includes the following step:

46) positioning the calibration device 18 in a second predefined calibration position within the calibration vehicle 16.

The calibration vehicle 16 further comprises a second receptacle for the calibration device 18. After the arrangement of the calibration device 18 in the second receptacle the calibration device is in the second predefined calibration position. To acknowledge that the calibration device is in the second calibration position, generating the reference measurement values relating to the second predefined relative position of the calibration device 18 with respect to the calibration vehicle 16 includes the following step:

48) operating the man-machine interface 22 of the calibration vehicle.

For increasing the quality and/or increasing the accuracy of the reference measurement values, generating the reference measurement values relating to the second predefined relative position of the calibration device 18 with respect to the calibration vehicle 16 includes the following steps:

50) repeatedly detecting the second predefined relative position of the calibration device 18 with respect to the calibration vehicle 16; and
52) averaging the measurement values detected by repeatedly detecting the relative position of the calibration device 18 with respect to the calibration vehicle 16.

To make the detected reference measurement values accessible for the vehicle user, the method further includes the following step:

54) storing the generated reference measurement values relating to the second predefined relative position of a calibration device 18 with respect to a calibration vehicle 16 in the database 28.

To be able to detect the relative position of the mobile terminal device 14 with respect to the vehicle 12 with an even higher accuracy later on, the method further includes the following step:

56) generating reference measurement values relating to vehicle-specific parameters.

The vehicle-specific parameters relate to the arrangement of the several antennas and the chassis materials of the vehicle 12. To also make these detected reference measurement values accessible for the vehicle user, the method further includes the following step:

58) storing the generated reference measurement values relating to vehicle-specific parameters in the database 28.

After any reference measurement values have been provided for use after storing the same in the database 28, the user of the vehicle may execute the following steps:

60) retrieving the generated reference measurement values from the database 28 by the vehicle 12; and
62) generating position measurement values which relate to the current relative position of the mobile terminal device 14 with respect to the vehicle 12.

As now the generated reference measurement values and the position measurement values exist which relate to the current relative position of the mobile terminal device 14 with respect to the vehicle 12, at last the following step may be executed:

64) evaluating the reference measurement values and the position measurement values for detecting the current relative position of the mobile terminal device 14 with respect to the vehicle 12.

By using reference measurement values which have been generated before the actual position determination, the invention enables to compensate measurement value variances of mobile terminal devices due to their design in the determination of a relative position of a mobile terminal device with respect to a vehicle.

LIST OF REFERENCE NUMBERS

10 system
12 vehicle
14 mobile terminal device
16 calibration vehicle
18 calibration device
20 evaluation device
22 man-machine-interface
24 man-machine-interface
26 central computer
28 database
30 vehicle manufacturer
32-64 method steps

The invention claimed is:
1. A method for detecting a relative position of a mobile terminal device with respect to a vehicle, comprising the following steps:

generating reference measurement values which relate to a predefined relative position of a calibration device with respect to a calibration vehicle;

generating position measurement values which relate to the current relative position of the mobile terminal device with respect to the vehicle;

evaluating the reference measurement values and the position measurement values for detecting the current relative position of the mobile terminal device with respect to the vehicle; and storing the generated reference measurement values in a database, wherein the database is a database outside the vehicle which the vehicle may access by means of a communication connection.

2. The method of claim 1, characterized in that the mobile terminal device is used as a calibration device and/or the vehicle is used as a calibration vehicle.

3. The method of claim 1, characterized in that a reference device structurally identical to the mobile terminal device is used as the calibration device and/or that a reference vehicle structurally identical to the vehicle is used as the calibration vehicle.

4. The method of claim 1, characterized by the following step:

retrieving the generated reference measurement values from the database by the vehicle.

5. The method of claim 1, characterized in that generating the reference measurement values and/or storing the reference measurement values is done by the manufacturer of the vehicle and/or by a user of the vehicle.

6. The method of claim 1, characterized in that generating the reference measurement values which relate to a predefined relative position of the calibration device with respect to the calibration vehicle further includes:

positioning the calibration device in a predefined calibration position within the calibration vehicle.

7. The method of claim 1, characterized in that generating the reference measurement values which relate to a predefined relative position of the calibration device with respect to the calibration vehicle further includes at least one of the following steps:

repeatedly detecting the predefined relative position of the calibration device with respect to the calibration vehicle; or averaging the measurement values detected by repeatedly detecting the relative position of the calibration device with respect to the calibration vehicle.

8. The method of claim 1, characterized by the following step:

generating reference measurement values relating to several predefined relative positions of the calibration device with respect to the calibration vehicle.

9. The method of claim 1, characterized in that generating the reference measurement values which relate to a predefined relative position of the calibration device with respect to the calibration vehicle further includes at least one of the following steps:

operating a man-machine interface of the calibration device; or operating a man-machine interface of the calibration vehicle.

10. The method of claim 1, characterized by the step of:

generating reference measurement values relating to vehicle-specific parameters.

11. The method of claim 10, characterized in that the vehicle-specific parameters relate to the arrangement and/or implementation of one or several antennas, the chassis shape and/or the chassis materials of the vehicle.

12. The method of claim 1, characterized by at least one of the following steps:

validating the generated reference measurement values by the generated position measurement values;

adjusting the generated reference measurement values by the generated position measurement values; or replacing the generated reference measurement values by the generated position measurement values.

13. A system for detecting a relative position of a mobile terminal device with respect to a vehicle, comprising:

a mobile terminal device; and a vehicle comprising an evaluation device, wherein the system is configured to detect a relative position of the mobile terminal device with respect to the vehicle, the system being configured to:

generate reference measurement values which relate to a predefined relative position of a calibration device with respect to a calibration vehicle;

generate position measurement values which relate to the current relative position of the mobile terminal device with respect to the vehicle;

evaluate the reference measurement values and the position measurement values for detection of the current relative position of the mobile terminal device with respect to the vehicle; and store the generated reference measurement values in a database, wherein the database is a database outside the vehicle which the vehicle may access by means of a communication connection.

* * * * *